United States Patent
O'Neill et al.

(10) Patent No.: US 6,233,651 B1
(45) Date of Patent: *May 15, 2001

(54) PROGRAMMABLE FIFO MEMORY SCHEME

(75) Inventors: Eugene O'Neill, County Dublin; Anne O'Connell, Castleknock, both of (IE)

(73) Assignee: 3Com Technologies, Grand Cayman (KY)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,140
(22) PCT Filed: May 30, 1996
(86) PCT No.: PCT/EP96/02336
  § 371 Date: Jan. 20, 1999
  § 102(e) Date: Jan. 20, 1999
(87) PCT Pub. No.: WO96/38778
  PCT Pub. Date: Dec. 5, 1996

(30) Foreign Application Priority Data

May 31, 1995 (GB) ................................. 9510932

(51) Int. Cl.[7] ..................... G06F 12/00; G06F 13/00
(52) U.S. Cl. ..................... 711/101; 711/102; 711/5; 711/109; 711/110; 710/52; 710/56; 710/57
(58) Field of Search ............. 711/170–173, 109, 711/110; 710/18, 29, 48, 52, 56, 57, 132, 131; 370/230–232, 388–393

(56) References Cited

U.S. PATENT DOCUMENTS

| 4,807,183 | * | 2/1989 | Kung et al. .......................... 710/132 |
| 5,319,753 | * | 6/1994 | MacKenna et al. .................... 710/48 |
| 5,390,173 | * | 2/1995 | Spinney et al. ...................... 370/393 |
| 5,414,704 | * | 5/1995 | Spinney et al. ...................... 370/389 |
| 5,574,885 | * | 11/1996 | Denzel et al. ....................... 711/165 |
| 5,828,653 | * | 10/1998 | Goss .................................... 370/230 |

OTHER PUBLICATIONS

Computer Design, vol. 32, No. 6, Jun. 1, 1993, pp. 34–36 "Specialty SRAM combines best of dual–port SRAMs and FIFOs", see entire document.*

Velamurie et al, "A Multi–Queue Flexible Buffer Manager Architecture", Global Telecommunications Conference, 1993, IEEE 1993, pp. 1401–1405 vol. 3.*

Matsuo et al, "A Distributed Image Processing Environment VIOS III and it's Performance Evaluation", Pattern Recognition, 19938. Proceedings. vol. 2, 1998, pp. 1538–1542.*

Yamada et al, "A novel Approach to Realizing Flexible Transport Systems using Reconfigurable Hardware", Global Telecommunications Conference, 1995. Globecom, IEEE. vol. 1, 1005, pp. 67–71.*

* cited by examiner

Primary Examiner—Than Nguyen
(74) Attorney, Agent, or Firm—Wilson Sonsini Goodrich & Rosati

(57) ABSTRACT

A large FIFO memory device has its total available memory capacity partitioned into memory sections. The partitions are in the form of programmable delimiters in order to determine flexibly the size of the memory sections.

3 Claims, 1 Drawing Sheet

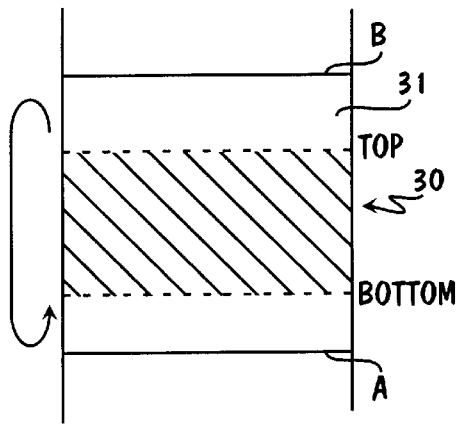
FIG. 1
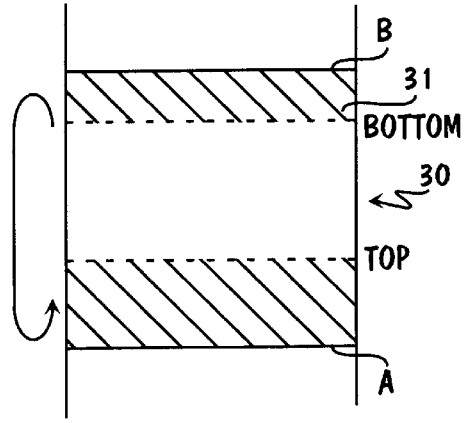
FIG. 2
FIG. 3a
FIG. 3b

PROGRAMMABLE FIFO MEMORY SCHEME

The present invention relates to a first in first out (FIFO) memory devices and more particularly to a method and apparatus for altering the boundaries of sections of a memory device whereby data is stored in a FIFO structure.

One use of the FIFO memory devices is in the field of computer networks where each port of the network has associated with it a section of memory. Customarily, the amount of memory associated with each port is fixed and the total amount is also shared in a fixed relationship between transmission and reception.

This can result in large amounts of memory being required which is inefficient and leads to undue expense.

The present invention proposes to provide programmable delimiters for a FIFO based memory device in order to determine flexibly the total amount of memory allocated to a port as well as the amount of memory allocated for transmission separately from the amount of memory allocated for reception at that port.

In order that the present invention be more readily understood, an embodiment thereof will now be described by way of example with referent to the accompanying drawing, in which:

FIG. 1 shows diagrammatically a conventional FIFO memory arrangement;

FIG. 2 shows diagrammatically a FIFO memory arrangement according to the present invention; and FIGS. 3a and 3b are diagrams to explain the operation of a FIFO according to the present invention.

A first in first out memory device is a well known memory arrangement which operates in the manner one would expect given its description. Data is written into the memory in a particular order and is read from the memory in the same order as it was written. In conventional network arrangements, each port is allocated a fixed amount of FIFO memory e.g. 64K bytes with in this example 32k bytes allocated for transmission and 32k bytes allocated to reception. As is apparent from FIG. 1 of the accompanying drawing, the memory associated with more than one port is provided in a single memory device. In the drawing, memory associated with 4 ports is shown.

The present invention proposes to adjust the position of the boundaries between the sections of memory. This is achieved by altering the address of the delimiters representing the beginning and end of each section of memory. By altering the delimiter addresses, one can vary the size of memory associated with each port as well as the relative sizes of the transmission and reception portions of memory associated with each port.

FIG. 2 shows diagrammatically how a FIFO memory could be partitioned according to the present invention. Here one assumes that there are four ports as before and that the total available memory is unaltered at 256K bytes. These numbers were chosen at random for the sake of example only.

It will be noted that port 4 according to this example has not been allocated any memory at all i.e. it is an unused port. Port 3 has been allocated 64K bytes divided equally between transmission and reception while port 2 has been allocated 60K bytes with more memory being allocated for transmissions than for receptions. Port 1 is allocated all the remaining memory with more allocated for reception than transmission. With this additional memory allocation, port 1 could, for example be used as an ethernet port with 100 MHz bandwidth while the other ports are normal 10 MHz ports.

The amount of memory associated with each port and the relative amounts of transmission and reception memory can be determined beforehand on the basis of likely traffic flows and then fixed. Alternatively, one can monitor the traffic associated with each of the ports and on the basis of actual traffic flows adaptively adjusts the positions of the delimiters, depending on the actual statistics of the transfer through the system.

In more detail, it will be understood that the size i.e. the number of bits in the words used for the delimiters is conditioned upon the maximum size of the memory as well as the size of the units of memory. For example, the delimiter could be used to allocate memory in blocks of 8K bytes so that with a total memory capability of 256K bytes a word of length 6 bits would be required for the pointer, whereas if the blocks were of 2K bytes then 8 bits would be required, or for full granularity blocks of 1 byte will require 18 bits.

Referring now to FIGS. 3a and 3b these are diagrams which will be used to describe the operation of the present invention. A FIFO 30 has an area of memory 31 defined by a bottom delimiter A and a top delimiter B, it being assumed that data enters at the top. As data is stored in the FIFO, a top pointer rises through the memory and as data is read from the memory a bottom pointer also rises through the memory. The positions of the pointers at one point in time are shown in FIG. 3a. Eventually, the top pointer will reach the top delimiter B. If the memory is not full i.e. if data is being read out, the bottom pointer will have risen off the bottom delimiter A and so the top pointer will now start again at the bottom delimiter A and rise through the memory in a circulating fashion as will the bottom pointer. This situation is represented in FIG. 3b which represents the pointers at another point in time.

If we now consider the effect of altering the delimiters A and/or B in order to alter the size of the memory 31, it will be understood that some control of the delimiter alteration is required. When a new delimiter is introduced it is possible in some circumstances to delete any data in the memory 31 and introduce the new delimiter. However, it is preferably to alter delimiters only when it is safe to do so or in a manner that no data is lost.

One way of controlling the alteration of delimiters is to monitor the relative position of the top and bottom pointers and only alter the top delimiter B when the top pointer is above the bottom pointer. The bottom delimiter can be altered as long as the bottom pointer is not at either the old or new bottom delimiter.

It will be appreciated that this process will allow very efficient use of the available memory which will save the amount of memory required as well as possibly allowing adaptive alteration of memory in existing networks to the existing traffic on the network.

What is claimed is:

1. A method of operating a plurality of first in, first out (FIFO) queues, each related to a respective network port, in a FIFO memory device, comprising:

defining at least a first FIFO memory area and a second FIFO memory area in a memory, each of the areas being defined between a respective top delimiter and a respective bottom delimiter;

providing a respective top pointer and a respective bottom pointer for each of the FIFO memory areas;

writing data for a first port into the first FIFO memory area at a location defined by the top pointer for the first FIFO memory space, reading out data for the first port at a location defined by the respective bottom pointer for the first FIFO memory space and circulating the top pointer and the bottom pointer through the first FIFO memory space;

writing data for another port into the second FIFO memory space at a location defined by the respective top pointer for the second FIFO memory space, reading out data for the other port at a location defined by the respective bottom pointer for the second FIFO memory space and circulating the top pointer and the bottom pointer through the second FIFO memory space;

monitoring the position of the respective top and bottom pointers for each of the FIFO memory spaces;

moving a top delimiter for any of the FIFO memory spaces only when the respective top pointer is above the respective bottom pointer; and moving a bottom delimiter for any of the memory spaces only when the bottom delimiter for any of the memory spaces is below the respective bottom pointer of the respective memory space.

2. The method of claim 1, wherein the plurality of FIFO queues are in a switch coupled to a computer network.

3. A first in, first out (FIFO) memory device, comprising:

means for defining at least a first FIFO memory area and a second FIFO memory area, each of the areas being defined between a respective top delimiter and a respective bottom delimiter;

means for providing a respective top pointer and a respective bottom pointer for each of the FIFO memory areas;

means for writing data for a first port into the first FIFO memory area at a location defined by the top pointer for the first FIFO memory space, reading out data for the first port at a location defined by the respective bottom pointer for the first FIFO memory space and circulating the top pointer and the bottom pointer through the first FIFO memory space;

means for writing data for another port into the second FIFO memory space at a location defined by the respective top pointer for the second FIFO memory space, reading out data for the other port at a location defined by the respective bottom pointer for the second FIFO memory space and circulating the top pointer and the bottom pointer through the second FIFO memory space;

means for monitoring the position of the respective top and bottom pointers for each of the FIFO memory spaces;

moving a top delimiter for any of the FIFO memory spaces only when the respective top pointer is above the respective bottom pointer; and moving a bottom delimiter for any of the memory spaces only when the bottom delimiter for any of the memory spaces is below the respective bottom pointer of the respective memory space.

* * * * *